Oct. 19, 1948.  H. J. LOUNSBURY  2,451,569
RAILWAY CAR-END BUFFER
Filed Nov. 3, 1944
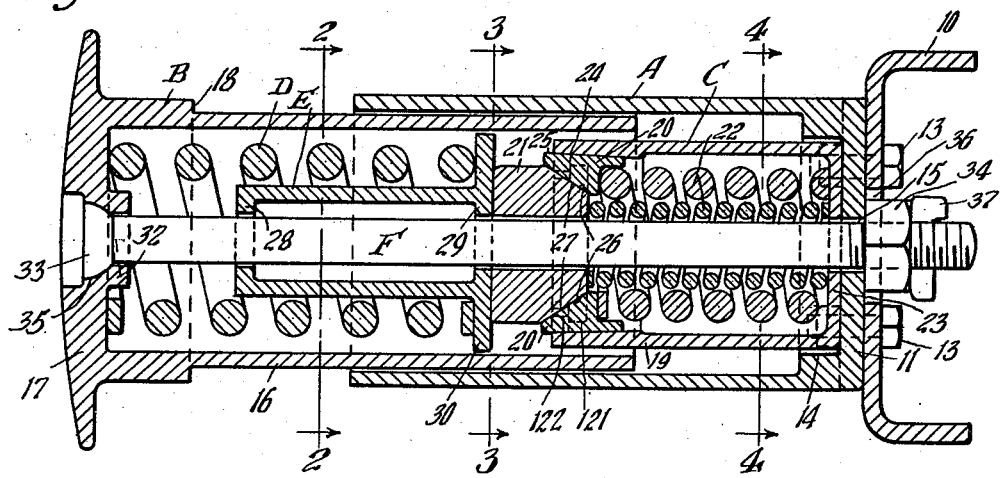
Inventor
Harvey J. Lounsbury
By Henry Fuchs.
Atty.

Patented Oct. 19, 1948

2,451,569

UNITED STATES PATENT OFFICE 2,451,569

RAILWAY CAR-END BUFFER

Harvey J. Lounsbury, Glen Ellyn, Ill., assignor to W. H. Miner, Inc., Chicago, Ill., a corporation of Delaware Application November 3, 1944, Serial No. 561,778.

3 Claims. (Cl. 213—221)

This invention relates to improvements in railway car-end buffers for railway cars.

One object of the invention is to provide an efficient buffer mechanism for railway cars, having preliminary spring action to absorb the lighter shocks to which the mechanism is subjected, and frictional resistance to take care of the heavier shocks, wherein the mechanism which provides the frictional resistance is positively actuated after the spring means, which provides the preliminary spring action, has been compressed to a predetermined extent.

A further object of the invention is to provide a buffer mechanism of the character hereinbefore set forth, comprising a buffer housing secured to the end of the car, a buffer head slidable within the housing, a preliminary spring within the buffer head to absorb the lighter shocks, and a friction shock absorber unit within the housing for absorbing the heavier shocks, wherein the friction shock absorber unit comprises a friction casing held against inward movement with respect to the housing, a spring resisted friction clutch slidingly telescoped within the friction casing, the friction clutch including friction shoes and a pressure transmitting block in wedging engagement with the shoes, and wherein the wedge of the friction shock absorber is positively actuated by a column element to which the actuating force is positively transmitted by inward movement of the buffer head after a predetermined compression of the preliminary spring, which spring reacts between the buffer head and the column element.

Other objects of the invention will more clearly appear from the description and claims hereinafter following.

In the drawing forming a part of this specification, Figure 1 is a longitudinal, vertical sectional view of my improved buffer mechanism, illustrating the same in position on the end of a railway car. Figures 2, 3, and 4 are transverse, vertical sectional views, corresponding respectively to the lines 2—2, 3—3, and 4—4 of Figure 1.

In said drawing, 10 indicates a portion of the end wall of a railway car, the portion illustrated being at one side of the longitudinal center line of the car and having my improved buffer mechanism mounted thereon. As will be understood, the buffer mechanism is duplicated at the other side of the car and the two mechanisms cooperate in a well-known manner with a pair of similar buffer mechanisms on the end of an adjacent car.

My improved buffer mechanism proper, as shown in the drawing, comprises broadly a housing A; a buffer head B; a friction shock absorber or friction shock absorber unit C; a preliminary spring resistance D; a pressure transmitting column element E; and a retainer bolt F.

The housing A is in the form of a tubular, cylindrical shell or casing closed at the rear end by a vertical, transverse wall 11. The wall 11 is extended laterally beyond the sides of the tubular housing A, thereby providing a pair of flanges 12—12 for securing the housing to the end wall 10 of the car. The housing A is preferably secured by bolts 13—13 extending through the flanges 12 and the end wall 10 of the car. The end wall 11 of the housing A is relatively thick, as clearly shown in Figure 1 of the drawing, and is provided with an inwardly facing, central seat or pocket 14 of hexagonal outline. The rear wall 11 is also provided with a central opening 15 adapted to accommodate the shank of the retainer bolt F.

The buffer head B includes a cylindrical shell portion 16, which extends rearwardly from the buffer head proper 17, which closes the front end of the shell forming the end wall of the same. The buffer head proper 17 projects laterally outwardly of the cylindrical shell 16, forming a continuation of the end wall of the shell. Immediately adjacent the wall 17, the cylindrical shell is thickened, as shown, thereby providing an annular stop shoulder 18 adapted to engage the front end of the housing A to limit inward movement of the buffer head. The cylindrical shell portion 16 of the buffer head is slidingly telescoped within the housing A and moves inwardly thereof when the buffer head is actuated by contact with the buffer head of an adjacent car.

The friction shock absorber C includes a friction casing 19; three friction shoes 20—20—20; a wedge pressure transmitting block 21, and a spring resistance 22. The casing 19 is open at its front end and is closed at the rear end by a vertical transverse wall 23. The casing 19 is seated in the hexagonal pocket 14 of the rear wall 11 of the housing A. At the forward or open end, the casing 19 is provided with three interior, V-shaped friction surfaces 24—24—24 which converge inwardly of the casing.

The friction shoes 20, which are three in number, are provided with outer, V-shaped friction surfaces 25—25—25, which respectively engage with the friction surfaces 24—24—24 of the casing 19. On the inner side, each shoe is provided with a flat wedge face 26. The wedge pressure transmitting block 21 has a flat front end face adapted to receive the actuating force. At the inner end, the wedge is provided with three flat wedge faces 27—27—27 which are symmetrically arranged about the axis of the same and engage with the wedge faces 26—26—26 of the shoes. The shoes 20—20—20, together with the wedge 21, form a friction clutch which is slidingly telescoped within the casing 19. The wedge is provided with three radially projecting retaining lugs 121 engaging between adjacent shoes and shouldering against three circumferentially spaced stop lugs 122 at the open end of the casing 19 to limit outward movement of the wedge and hold the mechanism assembled. Inward movement of the friction clutch is resisted by the spring 22 which comprises a relatively light, inner coil and a heavier outer coil. The inner coil bears at its front and rear ends respectively on the inner end of the wedge block 21 and the transverse end wall 23 of the casing 19. The outer coil bears at opposite ends on the shoes 20—20—20 and said rear wall 23 of the casing.

The pressure transmitting member E is in the form of a tubular, cylindrical sleeve closed at its front and rear ends by transverse, vertical walls 28 and 29. The rear wall 29 is extended laterally outwardly beyond the tubular side wall of the member E, thereby providing an annular flange 30, which serves as a follower member for the rear end of the preliminary spring D. The rear wall 29 and the flange 30, which forms a continuation thereof, bears directly on the front end of the wedge 21 of the friction shock absorber.

The preliminary spring D is in the form of a heavy coil disposed within the cylindrical shell section 16 of the buffer head B and surrounds the pressure transmitting member E, having its front end bearing on the inner side of the wall 17 of the buffer head and its rear end bearing on the flange 30 of the pressure transmitting column element E. The wall 17 of the buffer head is provided with an inwardly projecting, central boss 32 which extends into the front end of the preliminary spring D to center the same.

The retainer bolt F, which serves to hold the mechanism assembled and of uniform overall length, extends through aligned openings in the wall 17 of the buffer head B, the front and rear walls 28 and 29 of the pressure transmitting member E, the wedge 21, the rear wall 23 of the casing 19, and the rear wall 11 of the housing A. The retainer bolt F is headed at its front end, as indicated at 33, and is provided with threads at the rear end. The threaded end of the bolt receives the retaining nut 34. The head 33 of the bolt is anchored to the wall 17 of the buffer head, the latter being provided with a seat 35 receiving said head. The nut 34, which is threaded on the rear end of the bolt, bears on the outer side of the end wall 11 of the housing A, and the end wall 10 of the car is provided with a suitable opening 36 therein, adapted to accommodate the nut. The nut is preferably locked against removal by a key 37 which extends through the shank of the bolt.

In the normal position of the parts of the mechanism, the front end of the pressure transmitting column element E is spaced a predetermined distance from the inner side of the front wall 17 of the buffer head and the spring D is under initial compression.

The operation of my improved buffer mechanism is as follows: Upon inward movement of the buffer head B through pressure exerted thereon by any object, such as the buffer head of an adjacent car, the head B is forced inwardly of the housing A, compressing the spring D against the follower member of the pressure transmitting element, the latter being held against inward movement by the wedge 21 of the friction shock absorber, the frictional resistance to inward movement of the clutch comprising the wedge and the friction shoes 20—20—20 being too great to permit this movement. The lighter shocks to which the mechanism is subjected are thus absorbed by the spring D. As the head B moves further inwardly of the housing A, the front end of the pressure transmitting element E is engaged by the buffer head, thereby positively forcing the wedge 21 inwardly of the friction casing 19 of the friction shock absorber, thus taking care of the heavier shocks. When the actuating force is removed from the buffer head, all the parts of the mechanism are restored to the normal position shown in Figure 1 by the expansive action of the springs D and 22, outward movement of the head B being limited by the retainer bolt F.

I have herein shown and described what I now consider the preferred manner of carrying out my invention, but the same is merely illustrative and I contemplate all changes and modifications that come within the scope of the claims appended hereto.

I claim:

1. In a buffer for railway cars, the combination with a housing adapted to be secured to a car, said housing being closed at the rear end; of a friction shock absorber within the housing, said friction shock absorber including a casing open at one end and a spring resisted friction clutch slidable within said open end, said clutch including a wedge and friction shoes, said friction shock absorber being buttressed against the closed rear end of the housing; a buffer head slidingly telescoped within the housing; a pressure transmitting column element interposed between said buffer head and the friction shock absorber, bearing on the latter and having its front end normally spaced from the buffer head and adapted to be engaged and actuated thereby after a predetermined compression of the mechanism; and spring means interposed between the buffer head and the friction shock absorber and reacting between the buffer head and the column element to oppose relative approach thereof.

2. In a buffer for railway cars, the combination with a housing adapted to be secured to a car, said housing being closed at the rear end; of a friction shock absorber within the housing, said friction shock absorber including a casing open at its front end and a friction clutch slidable within said open end, said clutch including a wedge and friction shoes, said friction shock absorber being buttressed against the closed rear end of the housing; a buffer head slidingly telescoped within the housing; a pressure transmitting within the housing; a pressure transmitting column element interposed between said buffer head and the wedge of the friction shock absorber, said column element bearing on the wedge at one end and having its other end normally spaced a predetermined distance from the buffer head; and spring means interposed between the buffer head and the friction shock absorber and reacting between the buffer head and the column element.

3. In a buffer for railway cars, the combination with a housing adapted to be secured to a car; of a friction shock absorber within the housing held against inward movement with respect to the housing, said friction shock absorber including a friction shell, friction shoes slidingly telescoped within the shell, a wedge pressure transmitting member for spreading the shoes apart, and spring means within the shell opposing inward movement of the wedge and shoes; a hollow buffer head slidingly telescoped within the housing; a pressure transmitting column element having a follower at the rear end engaging the wedge, said pressure transmitting element being actuated by the buffer head after a predetermined compression of the mechanism; and a spring interposed between the buffer head and the friction shock absorber and reacting between the buffer head and the follower of the column element to oppose relative movement of the buffer head and column element toward each other.

HARVEY J. LOUNSBURY.

REFERENCES CITED

The following references are of record in the file of this patent:

UNITED STATES PATENTS

| Number | Name | Date |
| --- | --- | --- |
| 909,446 | O'Connor | Jan. 12, 1909 |
| 976,903 | O'Connor | Nov. 29, 1910 |
| 992,428 | Johnson | May 16, 1911 |
| 1,364,511 | O'Connor | Jan. 4, 1921 |
| 1,542,828 | O'Connor | June 23, 1925 |
| 2,146,015 | Hazeltine | Feb. 7, 1939 |

Certificate of Correction

Patent No. 2,451,569.  October 19, 1948.

HARVEY J. LOUNSBURY

It is hereby certified that error appears in the printed specification of the above numbered patent requiring correction as follows:

Column 4, lines 63 and 64, claim 2, strike out the words and semicolon "a pressure transmitting within the housing;";

and that the said Letters Patent should be read with this correction therein that the same may conform to the record of the case in the Patent Office.

Signed and sealed this 15th day of February, A. D. 1949.

[SEAL]

THOMAS F. MURPHY,
*Assistant Commissioner of Patents.*